United States Patent
Aradhye et al.

(10) Patent No.: US 7,792,333 B2
(45) Date of Patent: Sep. 7, 2010

(54) METHOD AND APPARATUS FOR PERSON IDENTIFICATION

(75) Inventors: Hrishikesh B. Aradhye, Mountain View, CA (US); Martin A. Fischler, Sunnyvale, CA (US); Robert C. Bolles, Mountain View, CA (US); Gregory K. Myers, San Francisco, CA (US)

(73) Assignee: SRI International, Menlo Park, CA (US)

( * ) Notice: Subject to any disclaimer, the term of this patent is extended or adjusted under 35 U.S.C. 154(b) by 1044 days.

(21) Appl. No.: 11/253,901

(22) Filed: Oct. 19, 2005

(65) Prior Publication Data

US 2007/0242858 A1    Oct. 18, 2007

Related U.S. Application Data (60) Provisional application No. 60/620,393, filed on Oct. 19, 2004, provisional application No. 60/633,593, filed on Dec. 6, 2004.

(51) Int. Cl.
G06K 9/00    (2006.01)
(52) U.S. Cl. ................................................... 382/115
(58) Field of Classification Search ................. 382/115, 382/254, 190, 162, 118; 392/195
See application file for complete search history.

(56) References Cited

U.S. PATENT DOCUMENTS

| | | | | |
|---|---|---|---|---|
| 4,216,787 A | * | 8/1980 | Moea | 132/250 |
| 5,163,094 A | * | 11/1992 | Prokoski et al. | 382/118 |
| 6,067,504 A | * | 5/2000 | MacFarlane et al. | 702/1 |
| 6,453,052 B1 | * | 9/2002 | Kurokawa et al. | 382/100 |
| 6,973,931 B1 | * | 12/2005 | King | 132/212 |
| 7,063,264 B2 | * | 6/2006 | Bi et al. | 235/487 |
| 7,489,816 B2 | * | 2/2009 | Ladjevardi | 382/167 |
| 7,693,310 B2 | * | 4/2010 | Kato et al. | 382/118 |
| 2001/0046311 A1 | | 11/2001 | Okano et al. | |
| 2002/0015514 A1 | | 2/2002 | Kinjo | |
| 2003/0147556 A1 | | 8/2003 | Gargesha et al. | |
| 2004/0170337 A1 | | 9/2004 | Simon et al. | |
| 2004/0201694 A1 | * | 10/2004 | Gartstein et al. | 348/207.99 |
| 2005/0265945 A1 | * | 12/2005 | Schnoll | 424/70.14 |

OTHER PUBLICATIONS

PCT Search Report and Written Opinion for PCT/US05/37481; copy consists of 9 unnumbered pages, None considered.

* cited by examiner

*Primary Examiner*—Daniel G Mariam
*Assistant Examiner*—Aklilu K Woldemariam (57) ABSTRACT

A method and apparatus are provided for person identification. In one embodiment, a method for identifying an individual includes obtaining at least one image of the individual, where the image depicts at least a portion of the individual's hair, comparing the visual characteristics of the individual's hair to the visual characteristics of imaged hair in one or more stored images, and identifying the individual based on the comparison.

28 Claims, 4 Drawing Sheets

METHOD AND APPARATUS FOR PERSON IDENTIFICATION

CROSS REFERENCE TO RELATED APPLICATIONS

This application claims the benefit of U.S. Provisional Patent Application Ser. No. 60/620,393, filed Oct. 19, 2004, and of U.S. Provisional Patent Application Ser. No. 60/633, 593, filed Dec. 6, 2004, both of which are herein incorporated by reference in their entireties.

REFERENCE TO GOVERNMENT FUNDING

This invention was made with Government support under contract number NMA401-02-9-2001, awarded by the National Geospatial-Intelligence Agency. The Government has certain rights in this invention.

FIELD OF THE INVENTION

The present invention relates generally to person identification and relates more specifically to biometric person identification techniques.

BACKGROUND OF THE DISCLOSURE

In many person identification scenarios (e.g., surveillance applications, security clearance or access applications, etc.), it is necessary that such identifications be performed unobtrusively, so that the subject may not even realize he or she is being observed. Many conventional identification techniques attempt to identify individuals through observation of unique biometric characteristics such as facial features, gait, voice or clothing. However, it is often difficult to obtain useful or usable samples of these biometric characteristics in an unobtrusive manner.

Thus, there is a need in the art for a method and apparatus for person identification.

SUMMARY OF THE INVENTION

A method and apparatus are provided for person identification. In one embodiment, a method for identifying an individual includes obtaining at least one image of the individual, where the image depicts at least a portion of the individual's hair, comparing the visual characteristics of the individual's hair to the visual characteristics of imaged hair in one or more stored images, and identifying the individual based on the comparison.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one embodiment, the present invention relates to a method and apparatus for person identification. The present invention enables accurate recognition of individuals in a substantially unobtrusive manner, using readily available and attainable data. In particular, the present invention relies on an analysis of the visual characteristics of human hair as a primary means of identification. The method and apparatus of the present invention may be applied in a variety of scenarios in which unobtrusive identification is required or where images of unidentified individuals (and more particularly, their hair) are available via overhead cameras, such as short-term tracking scenarios and security/access scenarios.

Figure 1:
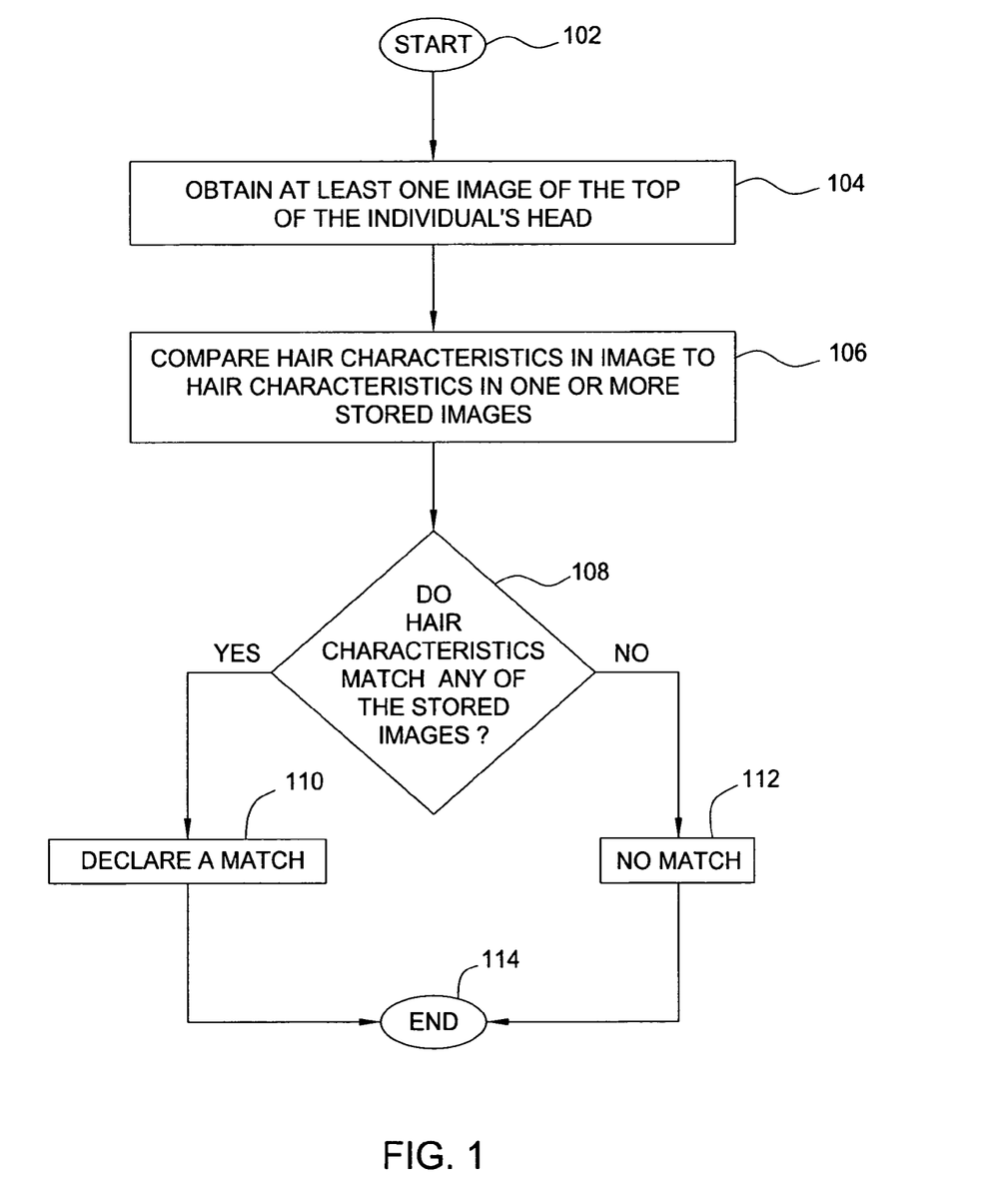
FIG. 1 is a flow diagram illustrating one embodiment of a method for person identification, according to the present invention.

FIG. 1 is a flow diagram illustrating one embodiment of a method 100 for person identification, according to the present invention. The method 100 is initialized at step 102 and proceeds to step 104, where the method 100 obtains at least one image of the top of an individual's head. The obtained image or images may be one or more still images or a series of video images. In one embodiment, the individual is a person whose identity needs to be established (e.g., for the purposes of determining whether the individual should be tracked or of determining whether the individual should be granted access to a given resource or location).

In step 106, the method 100 compares hair characteristics (e.g., color, texture, orientation, shape, etc.) visible in the image(s) obtained in step 104 to one or more stored images. The stored images comprise images of the tops of various individuals' heads. Thus, the method 100 compares the hair characteristics visible in these stored images to the hair characteristics visible in the obtained image(s). One embodiment of a method for performing such a comparison is described in further detail with respect to FIG. 2.

In step 108, the method 100 determines whether the hair characteristics visible in the obtained image(s), as a whole, match (e.g., are within a threshold degree of similarity to) any of the hair characteristics visible in the stored images.

If the method 100 determines in step 108 that the hair characteristics visible in the obtained image(s) match the hair characteristics visible in a stored image, the method 100 proceeds to step 110 and declares a match between the individual visible in the obtained image and the individual visible in the matching stored image (e.g., verifies that they are the same person). Alternatively, if the method 100 determines in step 108 that that the hair characteristics visible in the obtained image(s) do not match the hair characteristics visible in any of the stored image, the method 100 proceeds to step 112 and determines that no match exists (e.g., the individual visible in the obtained image can not be identified). In one embodiment, once the match determination is made (e.g., match or no match), the method 100 may store the obtained image for use in subsequent identification attempts. The method 100 then terminates in step 114.

By focusing on the visual characteristics of an individual's hair as a primary recognition attribute, reliable identification of that individual can be achieved in a substantially unobtrusive manner. The top of the head or the hair is often the part of the human body that is most visible (and most free of occlusion) to surveillance systems, such as overhead cameras. Many applications consider hair to be an impediment to identification (e.g., because it is easily changeable over the long term), but as the present invention demonstrates, techniques for performing identification based on hair characteristics can be effectively put to use in applications that, for example, re-establish or re-acquire human identification in short-term and/or multiple person tracking scenarios.

Figure 2:
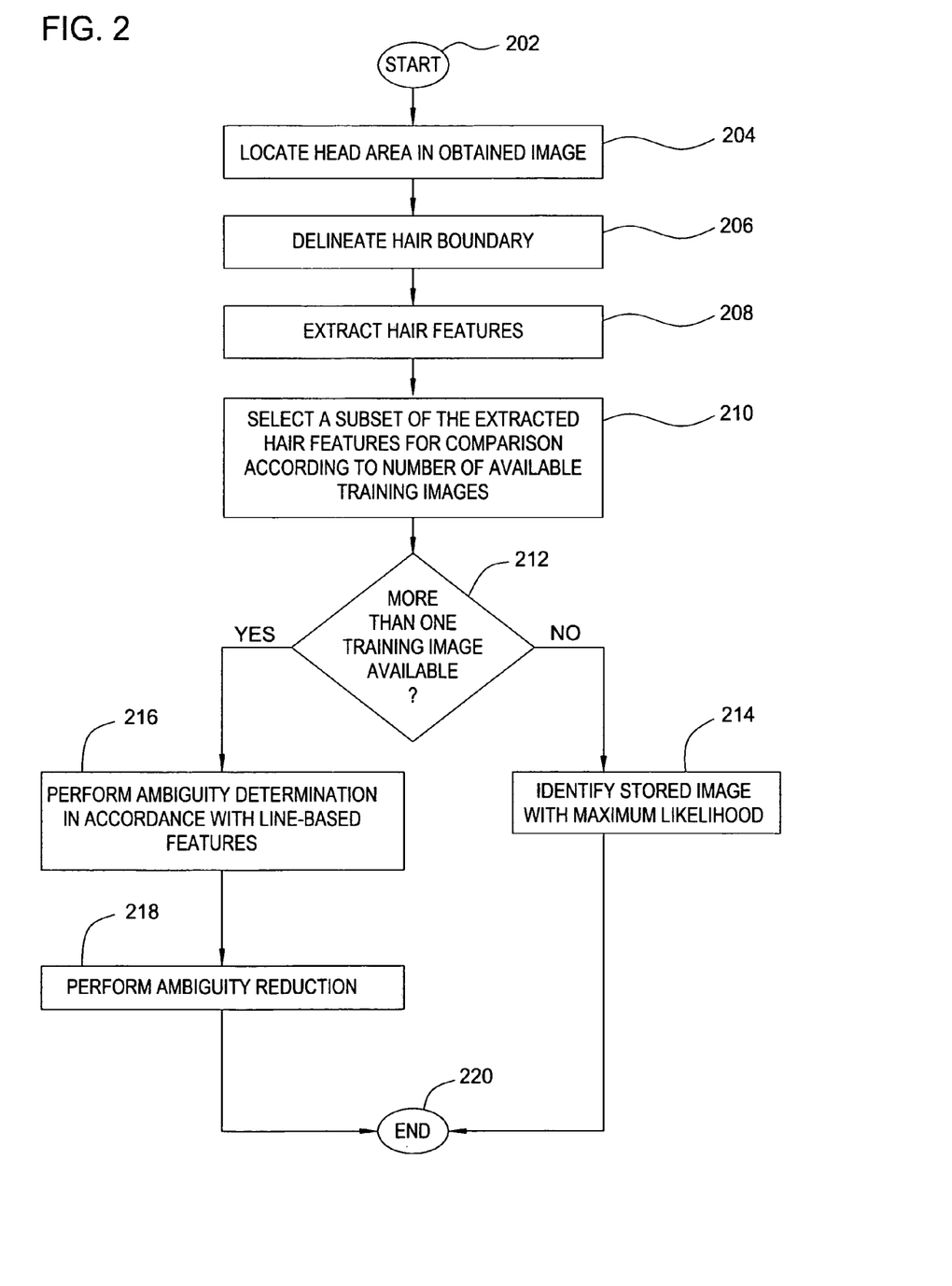
FIG. 2 is a flow diagram illustrating one embodiment of a method for comparing hair characteristics for identification purposes, according to the present invention.

FIG. 2 is a flow diagram illustrating one embodiment of a method 200 for comparing hair characteristics for identification purposes, according to the present invention. The method 200. may be implemented, for example, in accordance with step 106 of the method 100.

The method 200 is initialized at step 202 and proceeds to step 204, where the method 200 locates the head area in an obtained image of the top of an individual's head.

In step 206, the method 200 delineates the hair boundary in the obtained image. That is, the method 200 determines the "shape" of the individual's hair or hair style. In one embodiment, the method 200 delineates the hair boundary by distinguishing skin pixels in the image from non-skin pixels. The number of skin pixels in an image of an individual's head can be a measure of the degree of baldness and thus may aid in detecting individuals that are almost completely bald by delineating their head areas.

It is well known that regardless of race, human skin pixels in a color image taken under normal indoor/outdoor illumination fall into a relatively tight cluster in three-dimensional RGB color space. For example, in one embodiment, reasonably good skin detection results for the following values:

$$< \frac{I_R}{I_R + I_G + I_B} = 0.45 \pm 0.09 > \quad \text{(EQN. 1)}$$

$$< \frac{I_G}{I_R + I_G + I_B} = 0.33 \pm 0.05 > \quad \text{(EQN. 2)}$$

where $I_R$, $I_G$ and $I_B$ are intensities in the R (red), G (green) and B (blue) color channels, respectively.

In one embodiment, the method 200 detects hair boundaries on non-bald individuals by applying a line-texture operator, such as those used for extracting rural roads from satellite imagery, to the obtained image. The result is a binary mask image that asserts whether or not each pixel in the image depicts a line point. The basic premise is to examine the intensity variations along a set of probe lines, centered at a given pixel and sampling the major compass directions. If there is a significant local intensity extrema at the given pixel location along any of the probe lines, the mask value at the location of the given pixel is set to "true". The hair region is seen to exhibit a high density response to this operator.

In one embodiment, the binary mask image is then consolidated by the eight-connected grow/shrink sequence "GGSSSGG". A binary mask boundary-tracing algorithm is then applied to produce a detailed delineation of the hair region, which is subsequently replaced by its convex hull. In one embodiment, the hair region is finally identified as the largest circle that can be embedded inside the unsmoothed boundary or delineation. This substantially reduces background contamination of the hair region.

Figure 3:
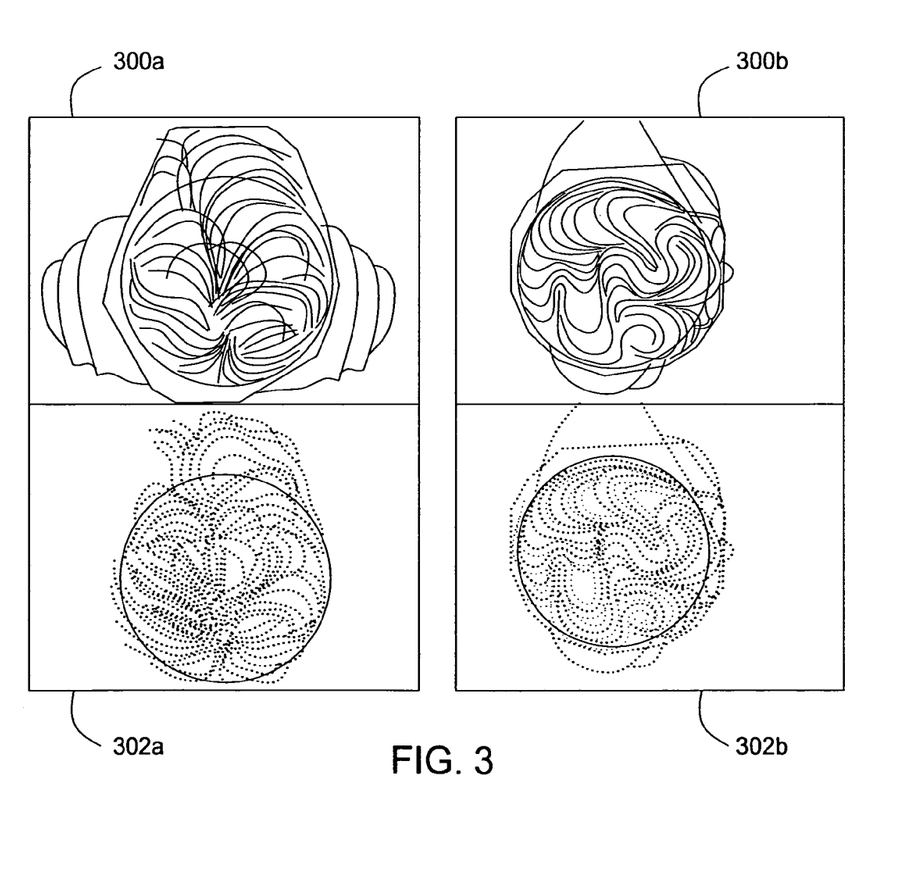
FIG. 3 is an illustration of an exemplary image of an individual's head and the corresponding hair delineation results, as obtained in accordance with FIG. 2.

FIG. 3 is an illustration of an exemplary image of an individual's head and the corresponding hair delineation results, as obtained in accordance with step 206 of the method 200. Specifically, FIG. 3 includes two images 300a-300b (hereinafter referred to collectively as "images 300") of two different individuals' heads, in which circles have been inserted to indicate a delineated hair boundary. Binary mask images 302a-302b (hereinafter collectively referred to as "binary mask images 302") illustrate the results of applying the line-texture operator to the images 300.

Referring back to FIG. 2, once the hair boundary has been delineated, the method 200 proceeds to step 208 and extracts hair features (e.g. color, texture, etc.) from the hair region defined by the delineated boundaries. In one embodiment, hair features are classified according to two broad classes of features: pixel-based features (e.g., characterized by direct operation on pixel data within the hair region) and line-based features (e.g., characterized by line-like hair characteristics). The relative significance of given features (e.g. color, texture, etc.) for identification purposes will vary from person to person.

The first class of features is pixel-based and treats hair as a generic textured surface to be characterized via standard statistical texture segmentation operations. In one embodiment, one or more algorithms belonging to the simultaneous autoregression (SAR) family of texture models is applied in an attempt to find the least-squares optimal set of coefficients that correlate the intensity of any pixel in the obtained image as a linear combination of the intensities of its neighboring pixels. The coefficients form a feature vector that can be used to distinguish different textures. In one particular embodiment, a multi-resolution rotation-invariant simultaneous autoregression (RISAR) technique (such as that proposed by Mao et al. in "Texture classification and segmentation using multiresolution simultaneous autoregressive models", *Pattern Recognition*, vol. 25, no.2, pp. 173-188, 1992) is applied in order to compensate for the fact that in a top-view scenario, the distance (and therefore magnification) of the hair from the camera changes according to the individual's height.

In one embodiment, the present invention applies a RISAR technique by first starting with a square patch of width N pixels located at approximately the center of the delineated hair boundary. In one embodiment, N=256. An appropriate square window of dyadic size W is then selected to slide over the patch. In one embodiment, W=32×32 pixels. This sliding window estimates texture and color features in a local neighborhood and provides a means of estimating global variances of these features.

For each sliding window of pixels in the patch, an L-level Gaussian pyramid is constructed. In one embodiment, L=3, such that the Gaussian pyramid comprises W×W, W/2×W/2, and W/4×W/4 pixel subimages. Rotationally invariant simultaneous autoregressive coefficients are then calculated to describe each of these sub-images as (p+1) parameters, where p is the number of expanding circular neighborhoods on which the SAR coefficients are computed. In one embodiment, p=3. The sliding window would then be described by (p+1)×L texture features.

In addition to the texture features, two color features are defined for each window, defined as $\bar{I}_G/\bar{I}_R$, and $\bar{I}_B/\bar{I}_R$, where $\bar{I}_R$, $\bar{I}_G$ and $\bar{I}_B$ are average intensities in the R, G and B color channels of the window, respectively. The sliding windows overlap by half the window size, along both X and Y directions. For a given patch, there is thus a feature matrix where each row is comprised of features representing one of the sliding windows. This feature matrix represents the multivariate distribution of pixel-based features characterizing the patch of hair.

The size, N, of the square patch depends on the resolution of the input imagery. In one embodiment, N is chosen such that the square patch covers roughly fifteen percent of the head surface of an average size head. A square patch that is too large may include hair areas that are not consistent in their texture patterns (e.g., due to hair parting), while a square patch that is too small may not provide enough information for reliable feature extraction. In one embodiment, for still images, the size, N, of the square patch is 256×256 pixels, where W=32 pixels and L=3. In another embodiment, for video images, N=128, W=16 and L=2 (due to the lower resolution of the images). In one embodiment p=3 for both cases. Thus, fourteen and 10 features are extracted, respectively, for each sliding window in the still and video images.

The second class of features is line-based and exploits the fact that hair is a collection of individual line-like structures or strands. In one embodiment, the present invention characterizes a plurality of line-based features, including, but not limited to, macrotexture, shape and color.

Figure 4A:
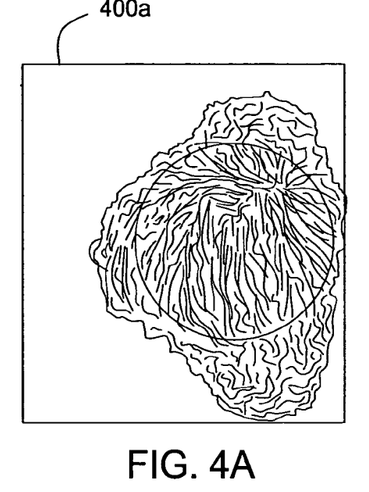
FIG. 4A is an exemplary binary mask image of the top of an individual's head, in which straight and curved line segments are extracted from the binary mask image.

Macrotexture attributes are based on first extracting straight or curved line segments from the binary mask image. FIG. 4A is an exemplary binary mask image 400a of the top of an individual's head, in which straight and curved line segments are extracted from the binary mask image 400a. All line points in the mask are then represented as nodes in a minimum spanning tree (MST), where the branches of the MST are line segments. The MST is then parsed into a collection of relatively smooth (extended) line segments, each of which is called a hair-line segment. In one embodiment, hair-line segments are established in accordance with at least one of the techniques described by M. A. Fischler and H. C. Wolf in "Linear Delineation", Proceedings of IEEE CVPR, 1983, pp. 351-356, by M. A. Fischler and H. C. Wolf in "Locating Perceptually Salient Points on Planar Curves", IEEE Trans. Pattern Anal. Mach. Intell., vol. 16, no. 2, pp. 113-129, 1994 and by M. A. Fischler and A. J. Heller in "Automated Techniques for Road Network Modeling", DARPA Image Understanding Workshop, 1998, pp. 501-516.

Figure 4B:
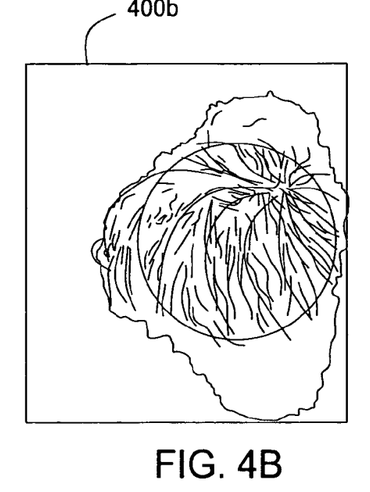
FIG. 4B is an exemplary image corresponding to the binary mask image of FIG. 4A, in which the longer and smoother hair-line segments have been selected.

Once the hair-line segments are established, the longer and smoother hair-line segments are then clipped so that only those hair-line segments within the delineated hair boundary are retained. FIG. 4B is an exemplary image 400b corresponding to the binary mask image 400a, in which the longer and smoother hair-line segments have been selected.

In one embodiment, there are two main types or metrics of macrotexture attributes associated with hair-line segments: orientation of the detected hair-line segments and length of the detected hair-line segments. Intuitively, the orientation metric is a measure of the degree of order in the arrangement of the hair. To characterize the orientation, each hair-line segment is represented as a sequence of straight-line sub-segments. The orientation and direction of each sub-segment is then computed, and a histogram is subsequently computed over the orientations of all such sub-segments, using eighteen bins (each spanning ten degrees). The partition that maximizes the total number of entries in any nine adjacent bins (with wrap-around) is then found. The value of the orientation metric is then the ratio of the number of sub-segments in the maximum partition to the total number of sub-segments. In one embodiment, curly or uncombed hair will have an orientation value of approximately 0.5, while relatively straight or combed hair would have a value closer to one.

To characterize the length, a cumulative distribution function (CDF) of the lengths of the hair-line segments is calculated. In one embodiment, the lengths corresponding to the CDF values of 0.1, 0.3, 0.6 and 0.9 are chosen as four length metrics.

Shape attributes or metrics are based on first delineating the hair boundary (as discussed above), and then measuring two properties of the hair boundary: its total length and the width-to-length ratio for a bounding minimum-width rectangle. In one embodiment, where the a person-identification method if attempting to choose between two or more alternative identities (e.g., stored images) as a match for a given individual, the actual two-dimensional boundary curves may also be used to perform area correlation as a comparative measure.

In one embodiment, color attributes are extracted by employing at least one of two color-labeling techniques: a first technique strictly concerned with detecting human skin color and a second technique (known as "relative ordering") in which color labels have no semantic significance. The relative ordering technique considers the relative intensity values of the RGB color components at each individual pixel. In one embodiment, one of twelve distinct categorical labels is assigned to each pixel by applying the conditions listed below in Table 1, starting from the top of Table 1 and working one's way down until the first matching condition is found. A histogram is then generated for the number of pixels (inside the hair boundary) with each of the twelve labels, and categorical values are assigned to two color metrics: the most frequently occurring label and the second most frequently occurring label.

TABLE 1

Relative ordering conditions

| RGB Condition | Pixel Label |
|---|---|
| $I_R < T$ AND $I_G < T$ AND $I_B < T$, where T = 30 | dark |
| $I_R = I_G \pm 20$ AND $I_G = I_B \pm 20$ AND $I_B = I_R \pm 20$ | white |
| Skin determination | skin |
| $I_R * 1.8 < I_G$ OR $I_B$ | color 1 |
| $I_G * 1.8 < I_R$ OR $I_B$ | color 2 |
| $I_B * 1.8 < I_R$ OR $I_G$ | color 3 |
| $I_R > I_G > I_B$ | color 4 |
| $I_R > I_B > I_G$ | color 5 |
| $I_G > I_R > I_B$ | color 6 |
| $I_G > I_B > I_R$ | color 7 |
| $I_B > I_R > I_G$ | color 8 |
| $I_B > I_G > I_R$ | color 9 |

Referring back to FIG. 2, once the hair features have been extracted, the method 200 determines which hair features (e.g., pixel-based or line-based) to use for comparison purposes. Given what will typically be a small number of training (e.g., stored) images for each individual already identified, it will be desirable to select only a subset of the extracted hair features for comparison purposes in order to avoid dimensionality. Thus, in step 210, the method 200 selects a subset of the extracted hair features for comparison, according to the number of available training images. In one embodiment, if only a single stored image is available for a given identified individual, only pixel-based features are selected because the pixel-based features provide a model of feature uncertainty for each individual even when limited to a single stored image (by virtue of the computation from multiple sliding windows over the square patch of hair). Pixel-based features may also be selected where the individual to be identified is determined to be bald. In another embodiment, where multiple stored images are available for the identified individuals, line-based features are selected because the line-based features provide characterization of the entire hair area (as opposed to just a patch). In further embodiments, where line-based features are initially selected but are unable to reduce the set of potential matches to a single best guess, pixel-based features are implemented to select the best candidate from among the set.

Once the hair features have been selected for comparison, the method 200 proceeds to step 212 and determines whether more than one stored image per identified individual is available for comparison. If the method 200 determines in step 212 that more than one stored image per identified individual is available, the method 200 proceeds to step 216 and performs ambiguity determination in accordance with the line-based features described above. For each stored image, the feature interval between the minimum and maximum observed feature values is determined. This interval is then expanded by a feature tolerance factor proportional to the feature interval's width (in one embodiment 25%) along both ends. The expanded interval acts as a filter for determining whether the obtained image of the unidentified individual is sufficiently similar (e.g., similar within a threshold) to a stored image. If a feature value of the unidentified individual lies outside the feature interval for a stored image, the corresponding feature filter is considered to fail. For multiple features, each feature interval acts independently to filter a given set of possible identities for the unidentified individual (input ambiguity set) to a smaller or equal-size set (output ambiguity set). In one embodiment, where the unidentified individual is completely or nearly bald, the input ambiguity set is composed as a collection of all of the stored images representing people of know identities who are also completely or nearly bald.

Once the input ambiguity set has been filtered, the method 200 proceeds to step 218 and performs ambiguity reduction. Where the unidentified individual is not determined to be completely or nearly bald, the feature tolerances for the members of the input ambiguity set are reduced to zero, thereby making filter matching criteria more strict. Thus, ambiguity reduction introduces an additional filter for hair boundary shape similarity. The first two members of the input ambiguity set are compared, using the extent of similarity with the obtained image of the unidentified individual defined as the total number of interval-based filters that succeed in matching.

If any feature value for the obtained image of the unidentified individual falls outside the feature intervals of both members of the input ambiguity set, and does not lie in the region between the two feature intervals, the filter with an interval-endpoint closest to the observed feature value is said to succeed. The input ambiguity set member with the lower extent of similarity is removed from contention. The surviving member of the input ambiguity set is then compared with the next remaining member, if any, of the input ambiguity set in the manner described above. This procedure is repeated until the entire input ambiguity set is exhausted.

Because of the possibility of a tie between members of the input ambiguity set, an output ambiguity set of greater than one could still be produced. In such an event, or where the unidentified individual and the individuals in the stored images are completely bald, the mean of pixel-based features is used in the interval-based recognition scheme described above (with a feature tolerance of zero) in order to select the single best stored image. There is also the possibility that neither scheme will identify a stored image in the input ambiguity set that is similar enough. In such a case, the image of the unidentified individual is rejected.

Alternatively, if the method 200 determines in step 212 that more than one stored image per identified individual is not available (e.g., only one stored image per identified individual is available), the method 200 proceeds to step 214 and identifies the stored image with a maximum likelihood relative to the obtained image. In this case, the method 200 assumes a multivariate Gaussian distribution for the pixel feature matrix and computes the mean feature vector, $\mu$, and the covariance matrix, $\Sigma$. Thus, given two patches of hair extracted from two different images indexed as i and j (e.g., the obtained image and a stored image), the likelihood that the patches belong to the same person is estimated as:

$$p_{i,j} = N_{\mu_j, \Sigma_j}(\mu_i) \times N_{\mu_i, \Sigma_i}(\mu_j) \tag{EQN. 3}$$

where $N_{\mu, \Sigma}(x)$ is the multivariate Gaussian probability density evaluated at x, with mean feature vector, $\mu$, and the covariance matrix, $\Sigma$. Given a patch of hair, i, the best match within a library of stored images of patches of hair having known identities is obtained as the patch, j, with the maximum likelihood $p_{i,j}$ as defined in EQN. 3. Since the texture color features used are rotationally invariant, this recognition strategy is inherently rotation invariant.

Figure 5:
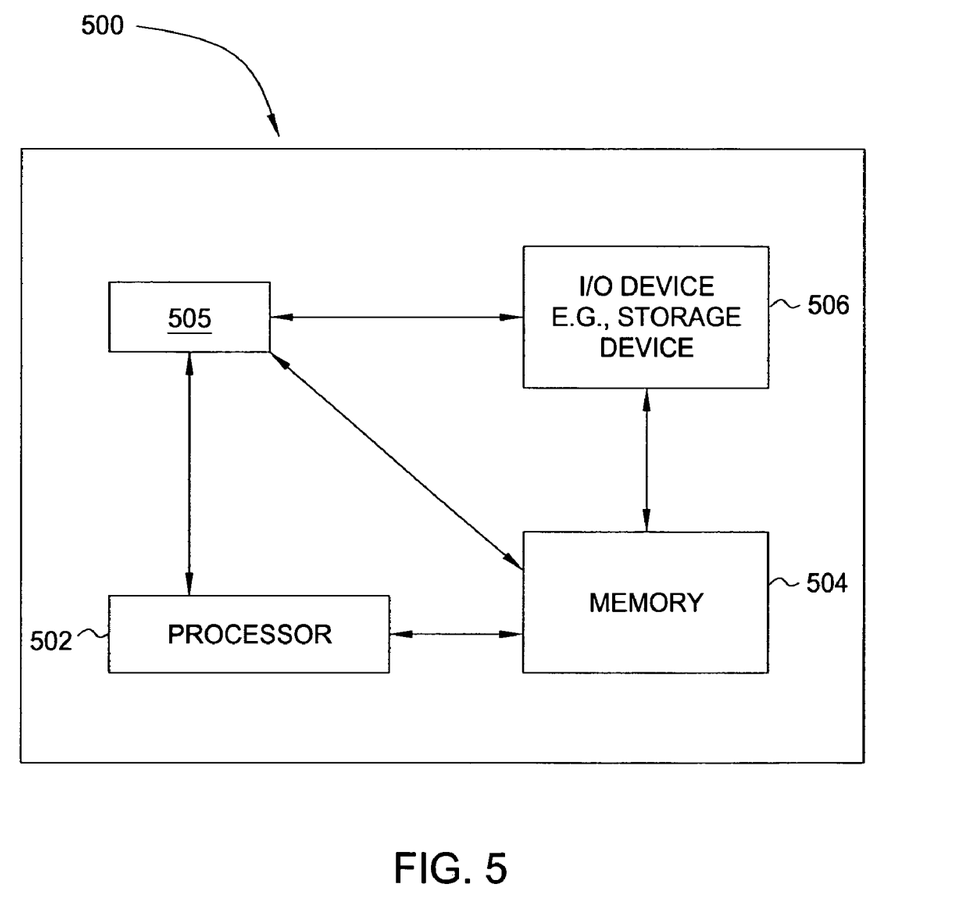
FIG. 5 is a high level block diagram of the present method for person identification that is implemented using a general purpose computing device.

FIG. 5 is a high level block diagram of the present method for person identification that is implemented using a general purpose computing device 500. In one embodiment, a general purpose computing device 500 comprises a processor 502, a memory 504, a person identification module 505 and various input/output (I/O) devices 506 such as a display, a keyboard, a mouse, a modem, and the like. In one embodiment, at least one I/O device is a storage device (e.g., a disk drive, an optical disk drive, a floppy disk drive). It should be understood that the person identification module 505 can be implemented as a physical device or subsystem that is coupled to a processor through a communication channel.

Alternatively, the person identification module 505 can be represented by one or more software applications (or even a combination of software and hardware, e.g., using Application Specific Integrated Circuits (ASIC)), where the software is loaded from a storage medium (e.g., I/O devices 506) and operated by the processor 502 in the memory 504 of the general purpose computing device 500. Thus, in one embodiment, the person identification module 505 for identifying individuals based on characteristics of their hair described herein with reference to the preceding Figures can be stored on a computer readable medium or carrier (e.g., RAM, magnetic or optical drive or diskette, and the like).

Thus, the present invention represents a significant advancement in the field of biometric person identification. A method and apparatus are provided that enable accurate recognition of individuals in a substantially unobtrusive manner, using readily available and attainable data. The method and apparatus of the present invention may be applied in a variety of scenarios in which unobtrusive identification is required or where images of unidentified individuals are available via overhead cameras, such as short-term tracking scenarios and security/access scenarios. In addition, commercial deployments are envisioned including automobile systems that adjust seats and mirrors in response to a recognition of an individual in the automobile (and knowledge of the recognized individual's adjustment preferences).

Although various embodiments which incorporate the teachings of the present invention have been shown and described in detail herein, those skilled in the art can readily devise many other varied embodiments that still incorporate these teachings.

What is claimed is:

1. A method for identifying an individual, comprising:
one or more processors implementing steps comprising:
obtaining at least one image of said individual, said at least one image depicting at least a portion of hair on a head of said individual;

locating a head area in said at least one image;

delineating a hair boundary in said head area, said hair boundary distinguishing said hair from skin of said individual;

extracting at least one visual characteristic of said hair from within said hair boundary, wherein said extracting comprises:

defining, within said hair boundary, at least one of: one or more pixel-based features of hair depicted within said hair boundary or one or more line-based features of hair depicted within said hair boundary, wherein said one or more line-based features comprise at least one of: one or more macrotexture attributes, one or more shape attributes, or one or more color attributes, and wherein said one or more shape attributes define at least one of: a total length of said hair within said hair boundary or a width-to-length ratio for said hair within said hair boundary;

comparing said at least one visual characteristic in said at least one image to at least one visual characteristic of imaged hair in one or more stored images; and identifying said individual based on said comparing.

2. The method of claim 1, wherein said at least one image depicts a top of said head.

3. The method of claim 1, wherein said one or more stored images depict tops of heads of a plurality of previously identified individuals.

4. The method of claim 1, wherein said at least one image is at least one of: at least one still image or a series of video images.

5. The method of claim 1, wherein said identifying comprises:

selecting one of said one or more stored images that most closely resembles said at least one image, based on said at least one characteristic; and assuming that said individual is an identified individual depicted in said one of said one or more stored images.

6. The method of claim 1, wherein said delineating comprises:

applying a line-texture operator to said at least one image to produce a corresponding binary mask image;

consolidating said binary mask image using a grow/shrink sequence;

applying a boundary-tracing technique to said consolidated binary mask image to produce a detailed delineation;

replacing said detailed delineation with a corresponding convex hull; and determining a largest circle that can be embedded inside said convex hull.

7. The method of claim 1, wherein said one or more pixel-based features characterize said hair depicted within said hair boundary according to at least one statistical texture segmentation operation.

8. The method of claim 1, wherein said one or more macrotexture attributes define at least one of: orientation of said hair within said hair boundary, direction of said hair within said hair boundary, or length of said hair within said hair boundary.

9. The method of claim 1, wherein said one or more color attributes are defined in accordance with a relative ordering technique.

10. The method of claim 1, wherein said comparing comprises:

relying on at least one pixel-based extracted characteristic for comparison purposes, if said one or more stored images comprise only one stored image per individual depicted therein.

11. The method of claim 10, wherein said comparing further comprises:

identifying one of said one or more stored images having a maximum likelihood relative to said at least one image of said individual.

12. The method of claim 1, wherein said comparing comprises:

relying on at least one line-based extracted characteristic for comparison purposes, if said one or more stored images comprise more than one stored image per individual depicted therein.

13. The method of claim 12, wherein said comparing further comprises:

filtering said one or more stored images such that a subset of said one or more stored images is produced, said subset comprising one or more stored images within a threshold of similarity to said at least one image of said individual; and identifying an image from said subset that is most similar to said at least one image of said individual.

14. A non-transitory computer readable medium containing an executable program for identifying an individual, the program causing a processor to perform steps comprising:

obtaining at least one image of said individual, said at least one image depicting at least a portion of hair on a head of said individual;

locating a head area in said at least one image;

delineating a hair boundary in said head area, said hair boundary distinguishing said hair from skin of said individual;

extracting at least one visual characteristic of said hair from within said hair boundary, wherein said extracting comprises:

defining, within said hair boundary, at least one of: one or more pixel-based features of hair depicted within said hair boundary or one or more line-based features of hair depicted within said hair boundary, wherein said one or more line-based features comprise at least one of: one or more macrotexture attributes, one or more shape attributes, or one or more color attributes, and wherein said one or more shape attributes define at least one of: a total length of said hair within said hair boundary or a width-to-length ratio for said hair within said hair boundary;

comparing said at least one visual characteristic in said at least one image to at least one visual characteristic of imaged hair in one or more stored images; and identifying said individual based on said comparing.

15. The non-transitory computer readable medium of claim 14, wherein said at least one image depicts a top of said head.

16. The non-transitory computer readable medium of claim 14, wherein said one or more stored images depict tops of heads of a plurality of previously identified individuals.

17. The non-transitory computer readable medium of claim 14, wherein said at least one image is at least one of: at least one still image or a series of video images.

18. The non-transitory computer readable medium of claim 14, wherein said identifying comprises:

selecting one of said one or more stored images that most closely resembles said at least one image, based on said at least one characteristic; and assuming that said individual is an identified individual depicted in said one of said one or more stored images.

19. The non-transitory computer readable medium of claim 14, wherein said delineating comprises:

applying a line-texture operator to said at least one image to produce a corresponding binary mask image;

consolidating said binary mask image using a grow/shrink sequence;

applying a boundary-tracing technique to said consolidated binary mask image to produce a detailed delineation;

replacing said detailed delineation with a corresponding convex hull; and determining a largest circle that can be embedded inside said convex hull.

20. The non-transitory computer readable medium of claim 14, wherein said one or more pixel-based features characterize said hair depicted within said hair boundary according to at least one statistical texture segmentation operation.

21. The non-transitory computer readable medium of claim 14, wherein said one or more macrotexture attributes define at least one of: orientation of said hair within said hair boundary, direction of said hair within said hair boundary, or length of said hair within said hair boundary.

22. The non-transitory computer readable medium of claim 14, wherein said one or more color attributes are defined in accordance with a relative ordering technique.

23. The non-transitory computer readable medium of claim 14, wherein said comparing comprises:

relying on at least one pixel-based extracted characteristic for comparison purposes, if said one or more stored images comprise only one stored image per individual depicted therein.

24. The non-transitory computer readable medium of claim 23, wherein said comparing further comprises:

identifying one of said one or more stored images having a maximum likelihood relative to said at least one image of said individual.

25. The non-transitory computer readable medium of claim 14, wherein said comparing comprises:

relying on at least one line-based extracted characteristic for comparison purposes, if said one or more stored images comprise more than one stored image per individual depicted therein.

26. The computer readable medium of claim 25, wherein said comparing further comprises:

filtering said one or more stored images such that a subset of said one or more stored images is produced, said subset comprising one or more stored images within a threshold of similarity to said at least one image of said individual; and identifying an image from said subset that is most similar to said at least one image of said individual.

27. Apparatus for identifying an individual, the apparatus comprising:

means for obtaining at least one image of said individual, said at least one image depicting at least a portion of hair on a head of said individual;

means for locating a head area in said at least one image;

means for delineating a hair boundary in said head area, said hair boundary distinguishing said hair from skin of said individual;

means for extracting at least one visual characteristic of said hair from within said hair boundary, wherein said means for extracting comprises:

means for defining, within said hair boundary, at least one of: one or more pixel-based features of hair depicted within said hair boundary or one or more line-based features of hair depicted within said hair boundary, wherein said one or more line-based features comprise at least one of: one or more macrotexture attributes, one or more shape attributes, or one or more color attributes, and wherein said one or more shape attributes define at least one of: a total length of said hair within said hair boundary or a width-to-length ratio for said hair within said hair boundary;

means for comparing, said at least one visual characteristic in said at least one image to at least one visual characteristic of imaged hair in one or more stored images; and means for identifying said individual based on said comparing.

28. A method for identifying an individual, comprising:

one or more processors implementing steps comprising:

obtaining at least one image of the individual, the at least one image depicting at least a portion of hair on a head of the individual;

computing an orientation of the at least a portion of hair, wherein the computing comprises:

extracting a plurality of line segments from a binary mask image of the head, the line segments representing individual strands of the at least a portion of the hair;

representing each of the plurality of line segments as a series of straight-line sub-segments;

computing a histogram over individual orientations of all of the sub-segments, using n bins;

identifying a partition that maximizes a total number of entries in any n/2 adjacent bins of the n bins;

computing the orientation of the at least a portion of hair as a ratio of a number of the sub-segments in the partition to a total number of sub-segments in the series of sub-segments;

comparing the orientation of the at least a portion of hair to an orientation of imaged hair in one or more stored images; and identifying said individual based on the comparing.

* * * * *